3,560,520
Patented Feb. 2, 1971

3,560,520
IMIDAZOLINE/ALKYLENE OXIDE REACTION PRODUCTS

Warren L. Perilstein, Orchard Lake, Mich., assignor to Ethyl Corporation, New York, N.Y., a corporation of Virginia
No Drawing. Original application Dec. 22, 1967, Ser. No. 692,706, now Patent No. 3,449,095, dated June 10, 1969. Divided and this application Dec. 30, 1968, Ser. No. 800,315
Int. Cl. C07d 49/30
U.S. Cl. 260—309.6                          9 Claims

ABSTRACT OF THE DISCLOSURE

A gasoline having improved detergency and antiicing properties is described. The improved properties are effected by adding to the gasoline a small but effective quantity of a novel reaction product of (a) 1-hydroxyethyl-2-alkenyl imidazoline and (b) an alkylene oxide. The novel additive and the method of preparing it are also described.

CROSS REFERENCE TO RELATED APPLICATION

This application is a division of S.N. 692,706, filed Dec. 22, 1967, now U.S. 3,449,095.

BACKGROUND OF THE INVENTION

This invention is directed to gasolines containing additives which improve the detergency and antiicing characteristics of the gasoline, and the novel additives.

Gasolines used in internal combustion engines are known to cause undesirable deposits to form in the fuel system, for example, in the carburetor. As these deposits build up, they tend to block gasoline and air passages thereby reducing the operating efficiency of the engine.

Additives are available for gasoline which reduce the accumulation of these deposits in the carburetor. These additives are commercially referred to as carburetor detergents or gasoline detergents. The linear amino amide described in U.S. 2,839,373 is an example of a suitable detergent.

It is apparent that the development of new gasoline detergents would be a contribution to the art. The invention described below is directed to such a discovery.

SUMMARY OF THE INVENTION

A gasoline having improved detergency and antiicing properties containing a minor quantity of a product obtained on reacting (a) a 1-hydroxyethyl-2-$C_7$-$C_{19}$-alkenyl imidazoline and (b) a $C_2$-$C_8$ alkylene oxide; the novel reaction product obtained on reacting (a) and (b).

A typical suitable reaction product is obtained by reacting 1 - (2 - hydroxyethyl)2 - heptadecenyl imidazoline with propylene oxide.

DESCRIPTION OF THE PREFERRED EMBODIMENTS

An embodiment of this invention is a gasoline containing a detergent quantity of a product obtained from the process which comprises reacting (a) an imidazoline having the formula

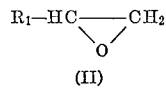

(I)

wherein R is a hydrocarbon alkenyl group having from 7 to about 19 carbon atoms, and (b) a lower alkylene oxide having the formula $$R_1-HC\underset{O}{\overset{}{\diagup\diagdown}}CH_2$$

(II)

wherein $R_1$ is seletced from hydrogen and alkyl groups having from 1 to about 6 carbon atoms, wherein the molar reaction ratio of the imidazoline to alkylene oxide is from about at least 1:1 to about 1:2, at temperatures of from about 80° C. to about 250° C. A preferred embodiment is the gasoline described above wherein R is an alkenyl group having from 11 to about 17 carbon atoms. Another preferred embodiment is a gasoline as described above wherein R in Formula I has 17 carbon atoms and $R_1$ in Formula II is a methyl group. The gasoline concentration of the product obtained from the reaction of compounds of Formula I and the compounds of Formula II in these embodiments is generally from 5 to about 200 parts per million (p.p.m.) by weight with 20 to about 70 p.p.m. by weight being preferred. A most preferred embodiment is the gasoline composition described above wherein the alkylene oxide is propylene oxide.

Another embodiment of this invention is the reaction product obtained on reacting the imidazoline having Formula I and a lower alkylene oxide having Formula II, as described above.

The reaction product which is used in the gasolines of the present invention is prepared by reacting an imidazoline having Formula I with an alkylene oxide having Formula II, at elevated temperatures. In general, the preparation is quite straightforward and amounts simply to adding the alkylene oxide to the imidazoline and then heating the mixture, at the proper temperature for a sufficient period of time. It is preferable to stir the mixture during the reaction.

The reaction is generally carried out at atmospheric pressure.

The imidazolines having Formula I which are useful in this invention are readily obtained by reacting suitable organic acids with N-(2-hydroxyethyl)ethylene diamine. This reaction involves the elimination of 2 molecules of water between the acid and the amine. This reaction is represented by the folowing equation:

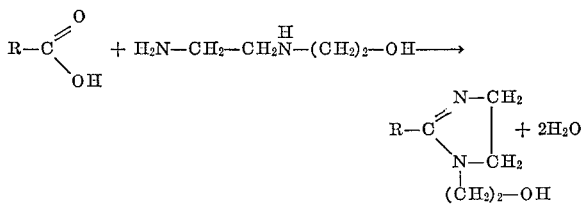

In addition to the imidazoline, small amounts of a corresponding linear amino amide are also obtained. This amino amide is the result of eliminating only one molecule of water between the acid and the amine. Methods of preparing the imidazolines are well known. Useful procedures are described in Wilson, U.S. 2,267,965, and Wilkes, U.S. 2,214,152. As can be seen from the reaction equation given above, the R group in the imidazoline is the alkenyl residue of the particular acid which is used in its preparation. In other words, the R group will have one carbon atom less than the acid which is used to prepare the imidazoline.

Acids which are useful in preparing the imidazolines are hydrocarbon mono-carboxylic acids having up to about 20 carbon atoms. The preferred acids are unsaturated organic acids are 9,10 decylenic acid, octenoic acid, oleic acid, linoleic acid, gadoleic acid and the like.

Preferred acids are commonly obtained as hydrolysis products of natural materials. These acids thus obtained are mixtures. For example, acids obtained from olive oil, typically are a mixture of about 83 percent oleic acid, 6 percent palmitic acid, 4 percent stearic acid and 7 percent linoleic acid. This mixture is quite useful for preparing imidazolines to be used in this invention. Organic acid mixtures obtained on saponifying and acidulating babassu oil, castor oil, peanut oil, palm oil and the like, are examples of useful acids. A preferred imidazoline is 2-heptadecenyl-1-(2-hydroxyethyl)imidazoline.

A lower alkylene oxide having Formula II is the second reactant in the process for preparing the gasoline additive used in the present invention. Suitable alkylene oxides have up to about 8 carbon atoms. These alkylene oxides are the terminal oxides, that is, the oxide configuration is in the 1,2-position in the molecule. Examples of useful alkylene oxides are 1,2-epoxy octane, 1,2-epoxy heptane, 1,2-epoxy pentane and the like. Preferred alkylene oxides are the terminal alkylene oxides having up to about 4 carbon atoms. Examples of preferred alkylene oxides are 1,2-epoxybutane and ethylene oxide. A most preferred alkylene oxide is propylene oxide.

In preparing the reaction product of imidazolines having Formula I and alkylene oxides having Formula II, the molar ratio of the imidazoline to alkylene oxide is at least about 1:1. Molar ratios of imidazoline to alkylene oxide of from about 1:1 to about 1:2 can be used; a 1:1 molar ratio is preferred.

The reaction between the imidazoline and alkylene oxide is generally carried out at temperatures of from about 80° C. up to about 250° C. The reaction is continued at this temperature until substantially all the imidazoline has reacted with the alkylene oxide. Generally, this reaction will be substantially complete in from about 15 to about 120 minutes, higher reaction temperatures favoring a shorter reaction time. After substantially all the imidazoline has reacted with the alkylene oxide, allowing the reaction mixture to stand for a longer time does not produce any substantial change in the product. Thus, the reaction mixture may be kept for 2–20 hours or even longer before the reaction product is recovered without affecting the chemical nature of the product. The reaction product obtained within this range of temperatures and times is substantially the same. In other words, the reaction may be carried out at 200° C. and be complete, that is, substantially all the imidazoline has reacted with the alkylene oxide, in 10 minutes; on the other hand, it will take a longer time, e.g. 30 minutes, to effect the same reaction at temperatures of about 100° C. In any event the product obtained is substantially the same and is useful in the gasolines of the present invention.

In preparing the reaction product of the present invention, the imidazoline is generally heated to the desired reaction temperature and then the alkylene oxide is added to it. If desired, a nitrogen blanket may be used when heating the imadazoline. This tends to protect the imidazoline from hydrolysis especially, when high temperature or extended heating periods are used. However, the imidazoline may also be heated in air without affecting the nature of the reaction product obtained. It is also more convenient to heat the imidazoline in air.

Furthermore, the reaction with the alkylene oxide need not be carried out under nitrogen. Therefore, the use of a nitrogen or other dry inert gas blanket is not essential in preparing the reaction products of the present invention.

The exact nature of the reaction which takes place and the product which is obtained is not fully understood. The product is characterized by the fact that (a) its composition indicates a ratio of one mole of imidazoline to about one mole of alkylene oxide and (b) that the imidazoline function is substantially destroyed. In other words, the product does not appear to be a simple alkoxylated imidazoline, but rather a novel composition of matter having substantially little imidazoline structure present. It is speculated that some cyclization may be occuring which involves the alkylene oxide and the imidazoline molecule; however, this theory is not meant to limit the scope of the reaction product obtained.

The absence of the imidazoline function is the reaction product is determined by infrared analysis. Where the starting imidazoline has a characteristic absorption band at 1550–1600 cm.$^{-1}$, the infrared spectrum of the reaction product shows substantially no absorption in the 1550–1600 cm.$^{-1}$ region. In the examples which will be presented below describing the preparation of the reaction product, the product will be characterized by stating that "the infrared analysis indicated that the imidazoline had reacted with the alkylene oxide"; this means that the characteristic imidazoline infrared absorption band was substantially absent.

Following are examples illustrating preparations of the reaction product disclosed above. All parts are by weight unless otherwise specified.

EXAMPLE 1

A vessel fitted with a nitrogen inlet, a thermometer and a stirrer was charged with 85.5 parts (0.2 mole) of 2-heptadecenyl-1(2-hydroxyethyl)imidazoline and heated to 180° C. under a stream of nitrogen. At this point a Dry Ice condenser was added to the system. The nitrogen flow was then discontinued and 11.7 parts (0.2 mole) of propylene oxide was added to the imidazoline over a 35 minute period, the temperature ranging from 180 to 192° C. The mixture was then stirred for 30 minutes at 175 to 180° C. and was then allowed to cool under an atmosphere of nitrogen. The product obtained was dissolved in benzene and transferred to a second vessel. There the benzene was removed under reduced pressure on a steam bath. The product obtained was 95.7 parts of a dark liquid. Infrared analysis indicated that the imidazoline had reacted with the propylene oxide. An elemental analysis of this product indicated total nitrogen was 6.5 percent, basic nitrogen was 3.18 percent. The product had a base number of 123.1.

EXAMPLE 2

A vessel fitted as in Example 1 was charged with 85.5 parts of the Example 1 imidazoline and heated to 120° C. under nitrogen. To this imidazoline was added 11.7 parts (0.2 mole) of propylene oxide was added through the Dry Ice condenser over a 33 minute period, temperature ranging from 115° C. to about 120° C. The mixture was then stirred at this temperature for thirty minutes. The product was recovered in a manner identical with that used in Example 1. The product obtained was a dark liquid; the yield was 95.2 parts. Infrared analysis again indicated that the imidazoline had reacted with the propylene oxide. Elemental analysis of the product showed total nitrogen was 6.59 percent and basic nitrogen was 2.99 percent; base number was 120.6.

EXAMPLE 3

A vessel fitted as in Example 1 was charged with 85.5 parts of the imidazoline of Example 1 and heated to 120° C. under a constant nitrogen purge. The imidazoline was then cooled to 90° C. and 11.7 parts of propylene oxide was added over a 45 minute period at a temperature ranging from 85 to 90° C. The mixture was then stirred at this temperature for 35 minutes and a product was recovered as in Example 1 above. The yield of product was 91.4 parts of a dark fluid. Infrared analysis indicated that the imidazoline had reacted. Elemental analysis of the product showed total nitrogen 6.77 percent, basic nitrogen 3.76 percent with a base number of 124.6.

EXAMPLE 4

A vessel fitted as in Example 1 was charged with 85.5 parts of the imidazoline of Example 1. The imidazoline was heated to 115° C. under a stream of nitrogen. The nitrogen flow was then stopped and 18 parts of 1,2-butylene oxide was added to the imidazoline over a two hour period. The temperature during this addition period ranging from 115 to 120° C. The product was a brown fluid and the yield was 99.5 parts. Infrared analysis showed that the imidazoline had reacted. Elemental analysis showed the product had a base number of 112.8; total nitrogen of 6.33 percent and basic nitrogen of 2.72 percent.

Similar results were obtained when 14.4 parts of butylene oxide were added to the imidazoline as in Example 4 over a period of 83 minutes. Analysis of the product thus obtained showed it had a base number of 113.5, total nitrogen of 6.54 percent and basic nitrogen of 2.81 percent.

EXAMPLE 5

A vessel fitted as in Example 1 was charged with 85.5 parts of an imidazoline of Example 1; the imidazoline was heated to 115° C. under a stream of nitrogen. The flow of nitrogen was discontinued and about 11 parts of ethylene oxide was slowly fed into the reaction vessel over about a 45 minute period with a temperature ranging from about 116 to about 121° C. The mixture was stirred for an additional hour at about this temperature and it was then allowed to cool under nitrogen. The product was recovered as in Example 1. The yield of a brown liquid product was 95.1 parts. Infrared analysis showed that the imidazoline had reacted. Further analysis showed the product had a base number of 117.4 with total nitrogen of 6.57 percent and basic nitrogen of 3.01 percent.

Similar results were obtained when the charge of imidazoline of Example 5 was 93.7 parts and the ethylene oxide added was about 12 parts. The product obtained in this case was 103.7 parts of a brown fluid. Infrared analysis showed that the imidazoline had reacted; further analysis showed that the product had a base number of 133.2 with total nitrogen of 6.82 percent and basic nitrogen of 3.27 percent.

Other useful reaction products are prepared by reacting the following listed imidazolines and alkylene oxides substantially as described in Examples 1–5.

TABLE 1

| Example | (a) Imidazoline of Formula I with R being— | (b) Alkylene oxide | Molar ratio, (a):(b) | Reaction temperature, °C. |
|---|---|---|---|---|
| 6 | Nonadecylene | Ethylene oxide | 1:1.1 | 250 |
| 7 | Heptylene | 1,2-epoxy octane | 1:1.9 | 150 |
| 8 | Undecylene | 1,2-epoxy pentane | 1:1.5 | 95 |
| 9 | Tetradecylene | 1,2-epoxy hexane | 1:2 | 180 |
| 10 | Nonylene | 1,2-epoxy heptane | 1:1.3 | 80 |
| 11 | Pentadecylene | 1,2-epoxy butane | 1:1.7 | 215 |

Any gasoline suitable for use in internal combustion engines may be used in the practice of this invention. By gasoline is meant a blend of hydrocarbons boiling from about 25° C. to about 225° C. which occur naturally in petroleum and suitable hydrocarbons made by thermal or catalytic cracking or reforming of petroleum hydrocarbons and mixtures thereof. Typical base gasolines are listed in Table 2.

TABLE 2.—BASE GASOLINES

| | A | B | C | D |
|---|---|---|---|---|
| Gravity, ° API | 59.9 | 56.6 | 62.0 | 39.7 |
| Reid vapor pressure, p.s.i | 9.0 | 11.2 | 10.7 | 10.2 |
| Sulfur, percent | .013 | .007 | .054 | .050 |
| Percent aromatics | 27.0 | 34.5 | 19.5 | 24.0 |
| Percent olefins | 11.0 | 8.0 | 18.5 | 12.5 |
| Percent saturates | 62.0 | 57.5 | 62.5 | 63.5 |
| ASTM Distillation, ° F.: | | | | |
| Initial B.P | 100 | 89 | 90 | 88 |
| 10% evaporation | 128 | 116 | 115 | 116 |
| 30% evaporation | 166 | 177 | 155 | 165 |
| 50% evaporation | 210 | 230 | 199 | 218 |
| 70% evaporation | 250 | 282 | 254 | 274 |
| 90% evaporation | 310 | 338 | 349 | 355 |
| End Point | 396 | 410 | 420 | 432 |

The improved gasoline compositions of the present invention can contain from about five parts per million (p.p.m.) by weight to about 200 p.p.m. by weight of said imidazoline/alkylene oxide reaction product. Concentrations of the imidazoline/alkylene oxide reaction product outside this range may also be used if desired.

In preparing the improved gasoline compositions of the present invention, the imidazoline/alkylene oxide reaction product can be added to the gasoline neat, that is, 100 percent active material, or as a concentrate in a suitable solvent. Suitable solvents for these additive concentrates can be hydrocarbons such as toluene, xylene and the like, lower alcohols, and the like. Concentrations of the reaction product additive in solution may range up to about 90 percent by weight. Use of a solution containing the reaction product may facilitate additive metering. In either case, conventional gasoline blend procedures and apparatus can be used in preparing the gasoline compositions.

The improved detergency characteristic of the gasoline compositions of this invention were determined using an actual engine test. The test involved measuring the amount of deposits formed on the carburetor of a 6-cylinder automobile engine. The procedure involves running the engine at idle (500–700 r.p.m.) and no load for 20 hours, feeding blowby [1.0 cu. ft. per minute (c.f.m.)] and exhaust (0.5 c.f.m.) into the carburetor intake air. The air to fuel ratio is 8.0 and the fuel is fed from the power jet only. The test is begun with a clean carburetor. At the end of the 20 hour test run, the carburetor is removed and the mg. of the total deposit formed in the carburetor (1) on a removable sleeve in the throttle body and (2) on the throttle plate are determined. The weight of deposit is obtained by subtracting the weight of the clean carburetor sections (1) and (2) from the weight of the sections after the test. The idle speed is used in the test since it is under this condition that carburetor formation is severe and adding blowby and exhausting to the carburetor air, further accelerates deposit formation.

Data obtained in a series of experiments run according to the general procedure outlined above are presented in the following table. The effectiveness of the present additives is compared to a commercial additive in this series of tests. All parts are by weight unless otherwise indicated.

TABLE 3.—CARBURETOR DETERGENCY EVALUATION IN BASE GASOLINE 1457-66 [1]

| Additive | Additive concentration, p.p.m. | Carburetor deposits, mg. |
|---|---|---|
| Test: | | |
| 1 — None | | 136 |
| 2 — Detergent A [2] | 15 | 78 |
| 3 — RP-1 [3] | 12.5 | 51 |
| 4 — Detergent A | 29 | 20 |
| 5 — RP-1 | 25 | 16 |
| 6 — Detergent A | 29 | 25 |
| 7 — RP-2 [4] | 25 | 58 |

[1] Base gasoline 1457-66 contains 22.0 percent aromatics, 62.5 percent saturates and 15.5 percent olefinics.
[2] Commercial detergent containing about 85 percent active ingredient.
[3] RP-1 = Reaction product of 1 mole 2-heptadecenyl-1-(2-hydroxyethyl)imidazoline and 1 mole propylene oxide.
[4] RP-2 = Reaction product of 1 mole 2-heptadecenyl-1-(2-hydroxyethyl)imidazoline and 2 moles propylene oxide.

The data in Table 3 clearly illustrates the effectiveness of the reaction products herein described as carburetor detergents in gasoline. The gasoline without a detergent (Test 1) shows a carburetor deposit build up of 136 mg. The reaction product of a heptadecenyl imidazoline and propylene oxide, in molar ratios of 1:1 (RP-1) and 1:2 (RP-2) reduce the amount of carburetor deposit from 60 percent up to 88 percent by weight (compare Test 1 with Tests 3, 5 and 7). In addition, the data shows that RP-1 is comparable in effectiveness to commercial Detergent A at 15 p.p.m. and superior to Detergent A at about 25 p.p.m.

Following is a list of gasoline compositions which are prepared using the base gasolines of Table 2 and the reaction products of Examples 6–11. Each of these compositions has carburetor detergency effectiveness comparable to that shown by the gasolines in Table 2, Tests 3, 5 and 7.

TABLE 4.—GASOLINE COMPOSITIONS

| | Base gasoline | Additive of example | Additive concentration, p.p.m. |
|---|---|---|---|
| Fuel composition: | | | |
| 1 | A | 6 | 5 |
| 2 | B | 7 | 200 |
| 3 | C | 8 | 150 |
| 4 | D | 9 | 100 |
| 5 | C | 10 | 20 |
| 6 | D | 11 | 35 |
| 7 | B | 8 | 48 |
| 8 | A | 7 | 10 |

In addition to carburetor detergency, the novel reaction products are also effective antiicing additives in gasoline.

The gasoline compositions of the present invention may contain other gasoline additives such as, for example, antiknock compounds (tetraethyllead, tetramethyllead, methylcyclopentadienyl manganese tricarbonyl and the like); scavengers (ethylene dibromide, ethylenedichloride and the like); phosphate deposit modifiers (cresyl diphenyl phosphate, trimethyl phosphate and the like); metal deactivators such as N,N'-disalicylidine-1,2-diamino propane; antioxidants (alkylated phenols, phenylene diamine derivatives and the like); lead appreciators (tert-butylacetate and the like); corrosion inhibitors, dyes and the like.

What is claimed is:
1. A reaction product obtained from the process which consists essentially of reacting (a) an imidazoline having the formula

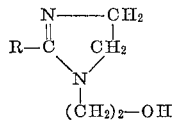

wherein R is hydrocarbon alkenyl of from 7 to 19 carbon atoms, and (b) a lower alkylene oxide having the formula

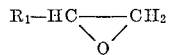

wherein $R_1$ is selected from hydrogen and hydrocarbon alkyl groups of from 1 to 6 carbon atoms, at molar reaction ratios of (a) to (b) of from at least about 1:1 to about 1:2, at atmospheric pressure and at temperatures of from about 80° C. to about 250° C., said reaction product being characterized by having an infrared spectrum showing substantially no absorption band at 1550–1600 cm.$^{-1}$, said absorption band being characteristic of the imidazoline ring.

2. A reaction product of claim 1 wherein R has 17 carbon atoms, $R_1$ is methyl and said molar ratio of imidazoline to alkylene oxide is about 1:1.

3. A reaction product of claim 1 wherein R has from 12 to 18 carbon atoms.

4. A reaction product of claim 1 wherein $R_1$ is selected from hydrogen, methyl, and ethyl.

5. A reaction product of claim 4 wherein said molar ratio is about 1:1.

6. A reaction product of claim 1 wherein R has 17 carbon atoms.

7. A reaction product of claim 6 wherein said molar ratio is about 1:1.

8. A reaction product of claim 7 wherein $R_1$ is hydrogen.

9. A reaction product of claim 7 wherein $R_1$ is ethyl.

References Cited
UNITED STATES PATENTS

| 2,211,001 | 8/1940 | Chwala | 260—309.6 |
| 2,987,514 | 6/1961 | Huches et al. | 260—309.6 |
| 3,056,688 | 10/1962 | Olney | 260—309.6 |
| 3,231,580 | 1/1966 | Mannheimer | 260—309.6 |

NATALIE TROUSOF, Primary Examiner

U.S. Cl. X.R.
44—63; 260—307

PO-1050
(5/69)

UNITED STATES PATENT OFFICE
CERTIFICATE OF CORRECTION

Patent No. 3,560,520              Dated February 2, 1971

Inventor(s) Warren L. Perilstein

It is certified that error appears in the above-identified patent and that said Letters Patent are hereby corrected as shown below:

In Column 4, line 7, "is" should be -- in --. In Column 5, line 69, "19.5" should be -- 19.0 --. In Column 6, line 55, "58" should be -- 56 --.

Signed and sealed this 11th day of May 1971.

(SEAL)
Attest:

EDWARD M. FLETCHER, JR.
Attesting Officer

WILLIAM E. SCHUYLER, JR
Commissioner of Patent